US 9,493,597 B2

(12) United States Patent
Hatakeyama et al.

(10) Patent No.: US 9,493,597 B2
(45) Date of Patent: Nov. 15, 2016

(54) POLYMER COMPOUND HAVING A SPECIFIC SUPER STRONGLY ACIDIC SULFO GROUP

(71) Applicant: SHIN-ETSU CHEMICAL CO., LTD., Tokyo (JP)

(72) Inventors: Jun Hatakeyama, Jyoetsu (JP); Koji Hasegawa, Jyoetsu (JP); Takayuki Nagasawa, Jyoestu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/564,494

(22) Filed: Dec. 9, 2014

(65) Prior Publication Data

US 2015/0175730 A1     Jun. 25, 2015

(30) Foreign Application Priority Data

Dec. 25, 2013   (JP) .................................. 2013-266366

(51) Int. Cl.
*C08F 220/38*   (2006.01)
*C08F 212/14*   (2006.01)

(52) U.S. Cl.
CPC ........... *C08F 220/38* (2013.01); *C08F 212/14* (2013.01)

(58) Field of Classification Search
None
See application file for complete search history.

(56) References Cited

U.S. PATENT DOCUMENTS

| | | | |
|---|---|---|---|
| 9,017,924 B2 | 4/2015 | Takaki et al. | |
| 2006/0047030 A1 | 3/2006 | Yoshida et al. | |
| 2007/0069185 A1 | 3/2007 | Hsu et al. | |
| 2008/0102407 A1* | 5/2008 | Ohsawa et al. ............ | 430/286.1 |
| 2010/0055608 A1 | 3/2010 | Ohashi et al. | |
| 2012/0012795 A1 | 1/2012 | Hsu | |
| 2012/0082939 A1 | 4/2012 | Kawabata et al. | |
| 2012/0129103 A1* | 5/2012 | Ohsawa et al. ............ | 430/285.1 |
| 2012/0202153 A1 | 8/2012 | Hatakeyama | |
| 2013/0224659 A1 | 8/2013 | Ohashi et al. | |
| 2013/0323647 A1 | 12/2013 | Ohashi et al. | |

FOREIGN PATENT DOCUMENTS

| | | |
|---|---|---|
| JP | A-2008-146913 | 6/2008 |
| JP | 2008-546899 A | 12/2008 |
| JP | A-2013-228447 | 11/2013 |
| WO | 2007/002682 A2 | 1/2007 |

OTHER PUBLICATIONS

Dec. 30, 2015 Office Action Issued in U.S. Appl. No. 14/564,167.
Oct. 26, 2015 Extended Search Report issued in European Patent Application No. 15001522.0.
Apr. 21, 2016 Office Action issued in U.S. Appl. No. 14/564,167.
Aug. 11, 2016 Office Action issued in U.S. Appl. No. 14/717,323.
Sep. 2, 2016 Office Action Issued in U.S. Appl. No. 14/564,167.

* cited by examiner

*Primary Examiner* — Robert C Boyle
(74) *Attorney, Agent, or Firm* — Oliff PLC

(57) ABSTRACT

The present invention provides a polymer compound which comprises both repeating unit "a" represented by the following general formula (1-1) and repeating unit "b" represented by the following general formula (1-2), and has a weight average molecular weight in the range of 1,000 to 500,000,

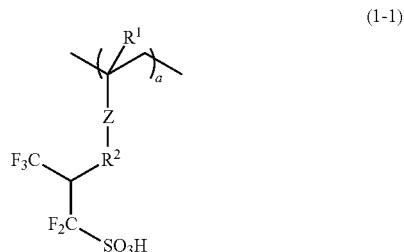

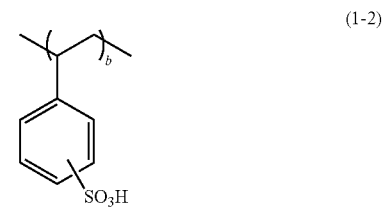

wherein $R^1$ represents a hydrogen atom or a methyl group, $R^2$ represents a single bond, an ester group, or a linear, branched, or cyclic hydrocarbon group having 1 to 12 carbon atoms which may have either or both of an ether group and an ester group, Z represents a phenylene group, a naphthylene group, or an ester group, and "a" and "b" satisfy $0<a<1.0$ and $0<b<1.0$. There can be provided a polymer compound having a specific super strongly acidic sulfo group, which is soluble in an organic solvent, and suitably used for a fuel cell or a dopant for a conductive material.

8 Claims, No Drawings

POLYMER COMPOUND HAVING A SPECIFIC SUPER STRONGLY ACIDIC SULFO GROUP

BACKGROUND OF THE INVENTION

Field of the Invention

The present invention relates to a novel polymer compound having a sulfo group.

Description of the Related Art

A polymer containing a sulfo group has been used as a fuel cell or a dopant polymer for a conductive polymer. As a material for a fuel cell, vinyl perfluoroalkyl ether sulfonic acid represented by Registered Trademark of Nafion has widely been used, and as a dopant polymer for a conductive polymer, a polymer of vinyl sulfonic acid or styrene sulfonic acid has widely been used (Patent Document 1).

The vinyl perfluoroalkyl ether sulfonic acid has chemically high stability and excellent durability, but the glass transition point thereof is low, so that there is a problem that when a fuel cell using it is exposed to high temperature, the polymer causes heat flow whereby ion conductivity thereof is lowered. A super strongly acidic polymer having a sulfo group an α-position of which has been fluorinated is effective for heightening ion conductivity, but a material having high glass transition point and chemical stability with high ion conductivity has not yet been found out.

Also, a conductive polymer having a conjugated double bond such as a polythiophene, a polyaniline, a polypyrrole, etc., does not show conductivity itself, but conductivity thereof is expressed by doping therein a strong acid such as sulfonic acid, etc. As the dopant, polystyrene sulfonic acid (PSS) has most frequently been used. This is because conductivity becomes the highest by doping the PSS.

PSS is a water-soluble resin, and is difficultly dissolved in an organic solvent. Accordingly a polythiophene which uses the PSS as a dopant is also water-soluble.

The polythiophene which uses the PSS as a dopant is highly conductive and highly transparent so that it has been expected to be a conductive film for an organic EL lighting substituting for ITO (indium-tin oxide. However, a luminous body of the organic EL chemically changes by moisture and stops to emit a light. That is, when a conductive film comprising a water-soluble resin is used for an organic EL, there is a problem that an emission lifetime of the organic EL becomes short due to the resin containing water.

PRIOR ART DOCUMENTS

Patent Documents

Patent Document 1; Japanese Patent Laid-open Publication No. 2008-146913

SUMMARY OF THE INVENTION

The present invention has been accomplished in view of the circumstances, and has an object to provide a polymer compound having a specific super strongly acidic sulfo group, which is soluble in an organic solvent, and suitably used for a fuel cell or a dopant for a conductive material.

To solve the problems, the present invention provides a polymer compound which comprises both repeating unit "a" represented by the following general formula (1-1) and repeating unit "b" represented by the following general formula (1-2), and has a weight average molecular weight in the range of 1,000 to 500,000,

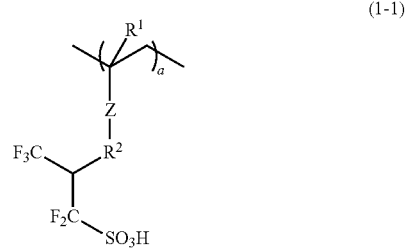

(1-1)

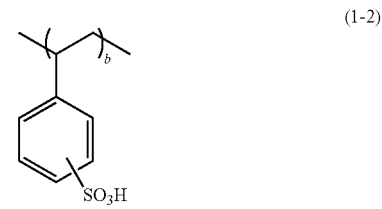

(1-2)

wherein $R^1$ represents a hydrogen atom or a methyl group, $R^2$ represents a single bond, an ester group, or a linear, branched, or cyclic hydrocarbon group having 1 to 12 carbon atoms which may have either or both of an ether group and an ester group, Z represents a phenylene group, a naphthylene group, or an ester group, and "a" and "b" satisfy $0<a<1.0$ and $0<b<0$.

Such a polymer compound can be a polymer compound having a specific super strongly acidic sulfo group, which is soluble in an organic solvent, and suitably used for a fuel cell or a dopant for a conductive material.

At this time, the repeating unit "a" preferably contains one or more selected from repeating unit "a1" to "a4" represented by the following general formulae (2-1) to (2-4),

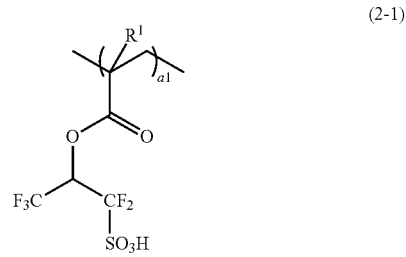

(2-1)

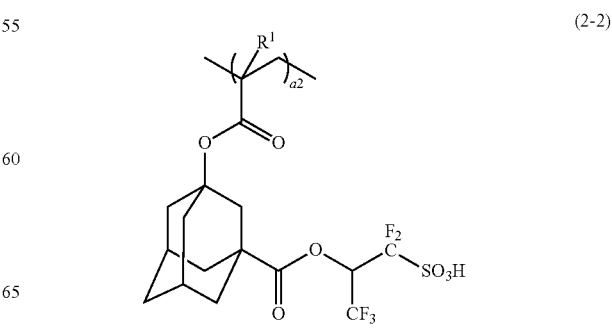

(2-2)

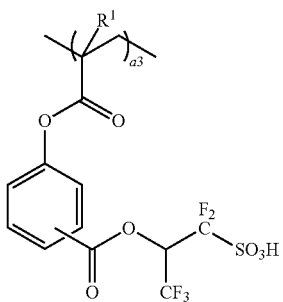

(2-3)

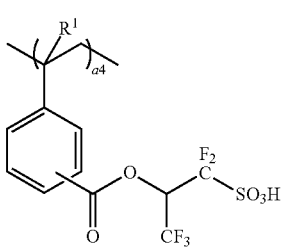

(2-4)

wherein $R^1$ has the same meaning as defined above, and "a1", "a2", "a3", and "a4" satisfy $0 \leq a1 < 1.0$, $0 \leq a2 < 1.0$, $0 \leq a3 < 1.0$, $0 \leq a4 < 1.0$, and $0 < a1+a2+a3+a4 < 1.0$.

If such a repeating unit is comprised, the polymer compound becomes a more suitable material for a fuel cell or a dopant for a conductive material.

At this time, the polymer compound is preferably a block copolymer.

If the polymer compound is a block copolymer, conductivity can be improved when it is used for a conductive film.

At this time, the polymer compound is preferably used as a dopant for a conductive polymer.

Accordingly, the polymer compound of the present invention can preferably be used as a dopant for a conductive polymer.

As mentioned above, the polymer compound of the present invention can be a polymer compound having a specific super strongly acidic sulfo group, which is soluble in an organic solvent, and suitably used for a fuel cell or a dopant for a conductive material such as a conductive polymer.

By using the polymer compound for a fuel cell, a material for a fuel cell having high dielectric constant can be formed. Also, by using it as a dopant for a conjugated double bond polymer, a conductive film having high transparency, high conductivity, and high durability can be formed. Moreover, it is excellent in solubility in an organic solvent, so that deterioration of an organic EL device can be prevented by using it as a conductive film for an organic EL lighting.

DETAILED DESCRIPTION OF THE PREFERRED EMBODIMENTS

As mentioned above, it has been desired to develop a polymer compound for a conductive polymer having a specific super strongly acidic sulfo group, which is soluble in an organic solvent, and suitably used for a fuel cell or a dopant for a conductive material.

For the purpose of preventing the deterioration of the organic EL device, by changing a water-soluble conductive polymer containing water which causes the deterioration into an organic solvent-soluble polymer containing an extremely little water content; the present inventors have tried to develop a polymer for a dopant having high solubility in an organic solvent from polystyrene sulfonic acid which is a dopant soluble in water but difficultly soluble in an organic solvent. They have investigated to introduce a fluorine since it is effective for increasing solubility in an organic solvent to introduce a long-chain alkyl group or a fluorine, and found out that the problems can be solved by using a polymer compound comprising particularly both a repeating unit having a sulfo group an α-position of which has been fluorinated and a repeating unit of styrene sulfonic acid, whereby accomplished the present invention.

The present invention provides a polymer compound which comprises both repeating unit "a" represented by the following general formula (1-1) and repeating unit "b" represented by the following general formula (1-2), and has a weight average molecular weight in the range of 1,000 to 500,000,

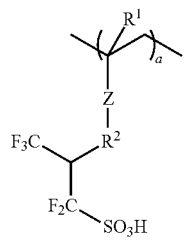

(1-1)

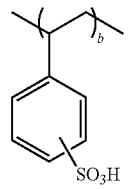

(1-2)

wherein $R^1$ represents a hydrogen atom, or a methyl group, $R^2$ represents a single bond, an ester group, or a linear, branched, or cyclic hydrocarbon group having 1 to 12 carbon atoms which may have either or both of an ether group and an ester group, Z represents a phenylene group, a naphthylene group, or an ester group, and "a" and "b" satisfy $0 < a < 1.0$ and $0 < b < 1.0$.

In the following, the present invention is explained in detail, but the present invention is not limited by these.

The polymer compound of the present invention comprises both repeating unit "a" represented by the general formula (1-1) and repeating unit "b" represented by the general formula (1-2).

By containing both the repeating unit "a" and the repeating unit "b" the polymer compound of the present invention can be a dopant which is capable of imparting excellent conductivity; therefore it can preferably be used particularly for a fuel cell and as a dopant for a conductive material such as a conductive polymer.

In the general formula (1-1), $R^1$ represents a hydrogen atom or a methyl group.

$R^2$ represents a single bond, an ester group, or a linear, branched, or cyclic hydrocarbon group having 1 to 12 carbon atoms which may have either or both of an ether group and an ester group; and the hydrocarbon group may be mentioned, for example, an alkylene group, an arylene group, an alkenylene group, etc.

Z represents a phenylene group, a naphthylene group, or an ester group.

At this time, the repeating unit "a" preferably contains one or more selected from repeating unit "a1" to "a4" represented by the following general formulae (2-1) to (2-4),

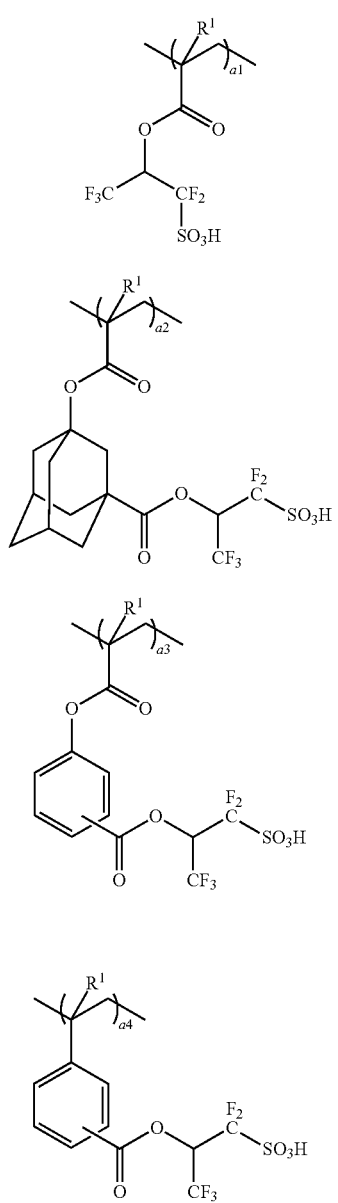

wherein $R^1$ has the same meaning as defined above, and "a1", "a2", "a3", and "a4" satisfy $0 \leq a1 < 1.0$, $0 \leq a2 < 1.0$, $0 \leq a3 < 1.0$, $0 \leq a4 < 1.0$, and $0 < a1+a2+a3+a4 < 1.0$.

If such a repeating unit is comprised, the polymer compound becomes a more suitable material for a fuel cell or a dopant for a conductive material.

Monomers imparting the repeating unit "a" may be specifically exemplified by the following.

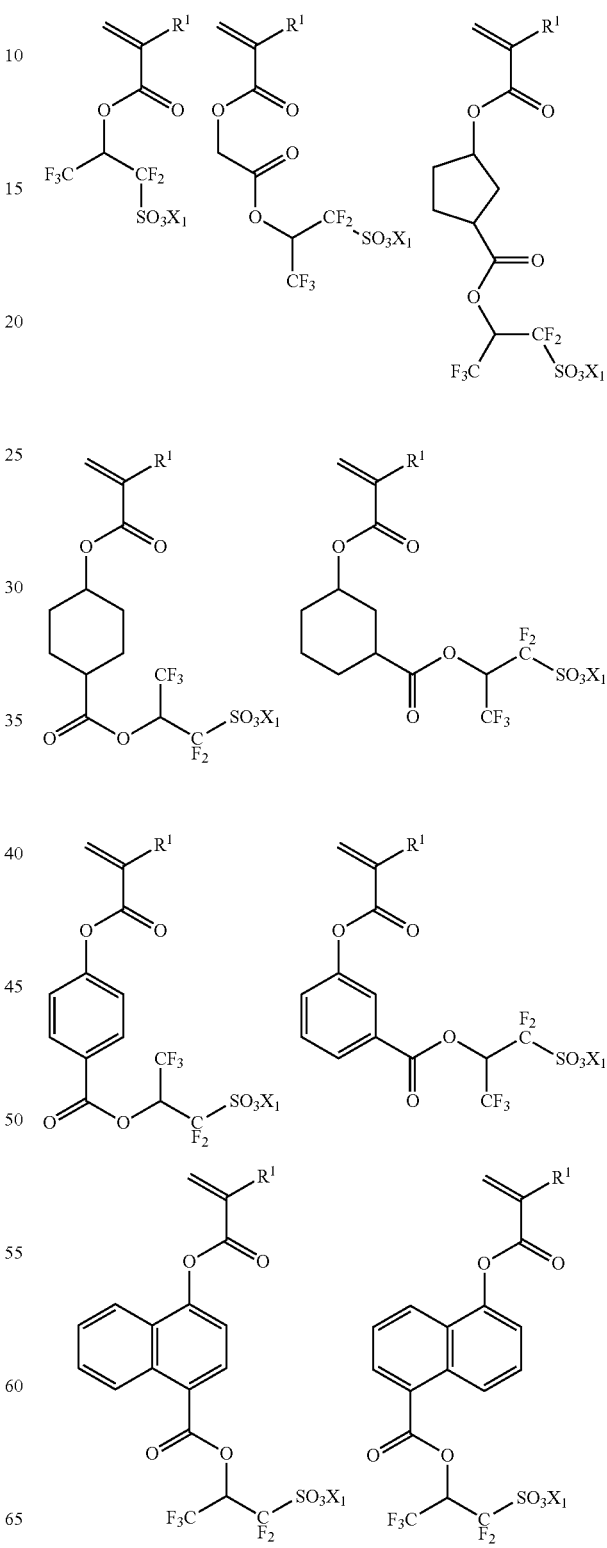

-continued
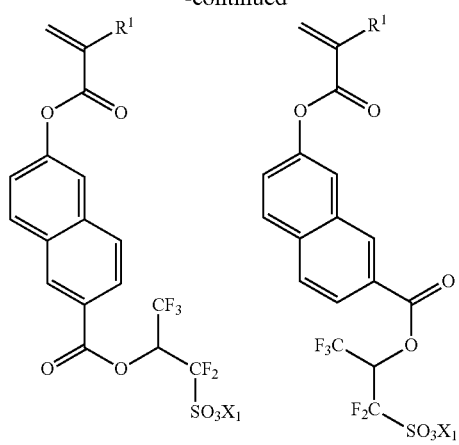
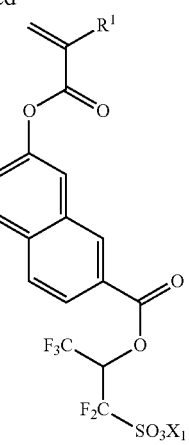
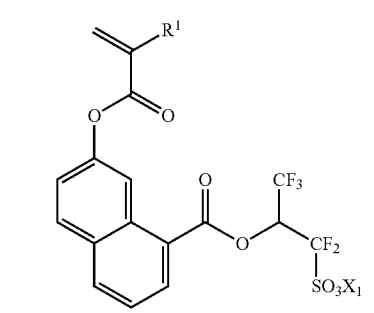
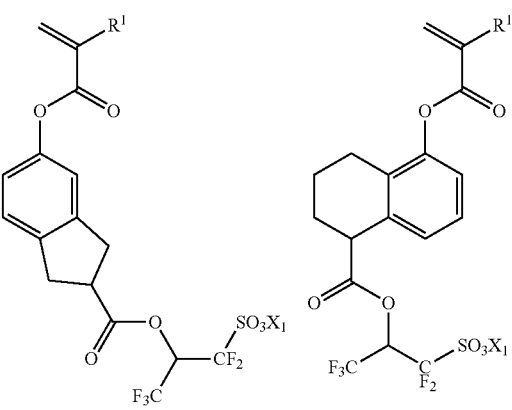
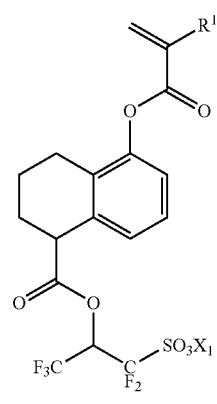
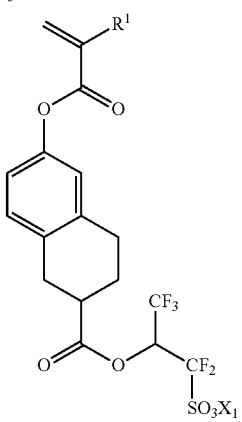
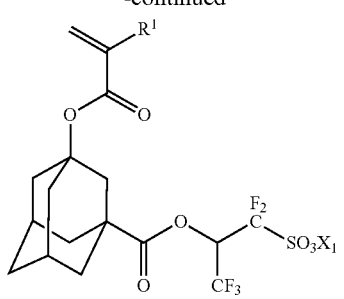
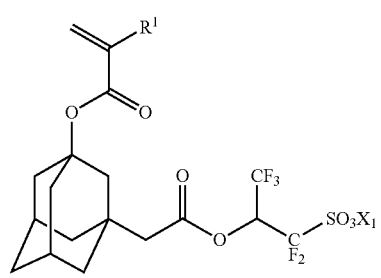
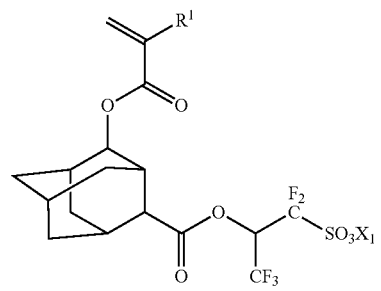
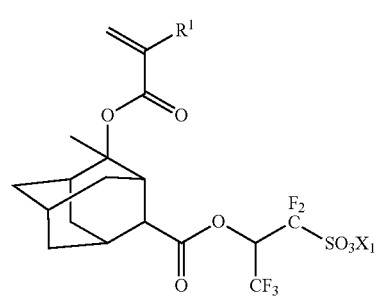
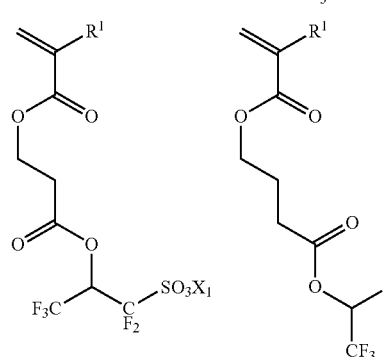

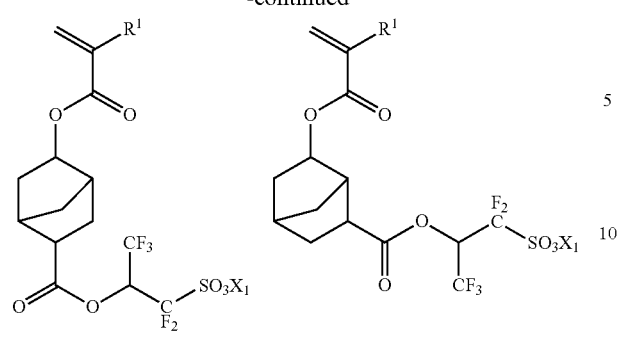
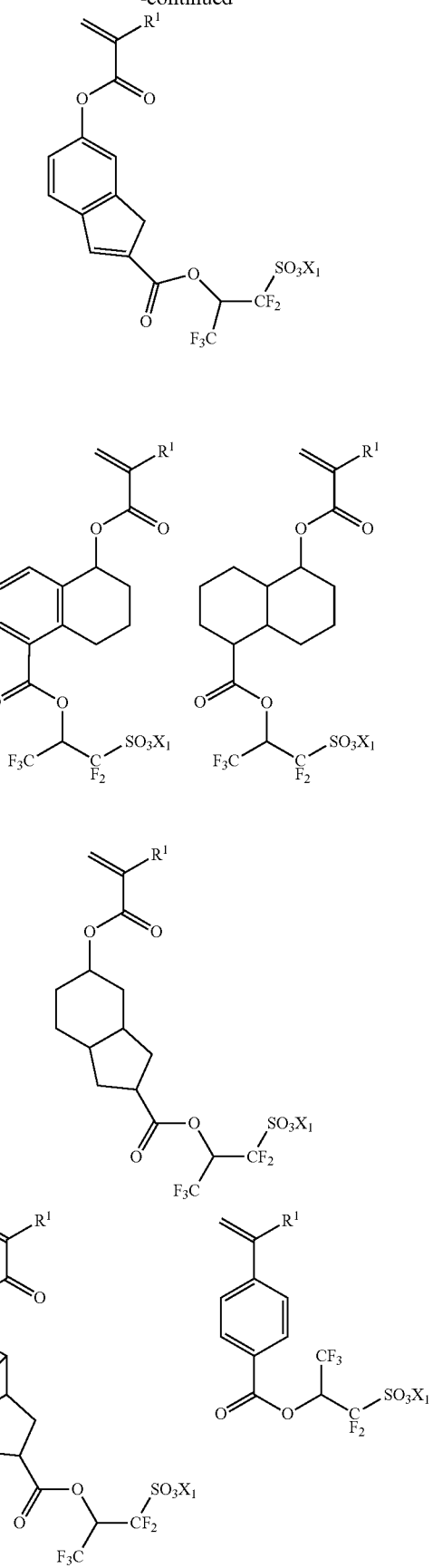

-continued
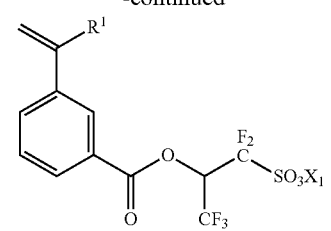
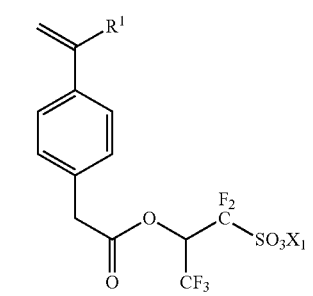
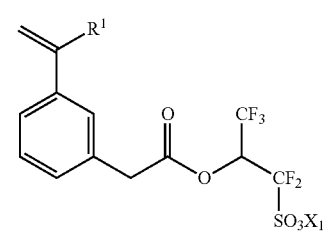
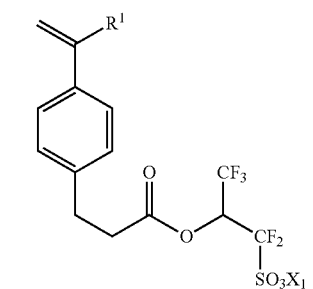
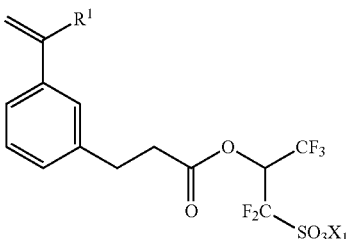
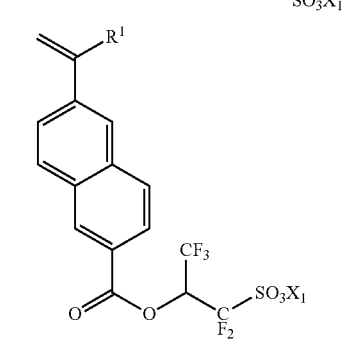
-continued
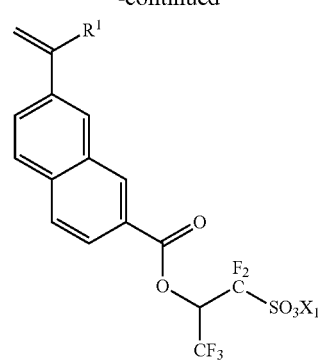
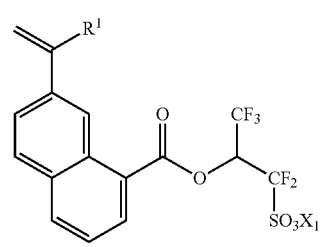
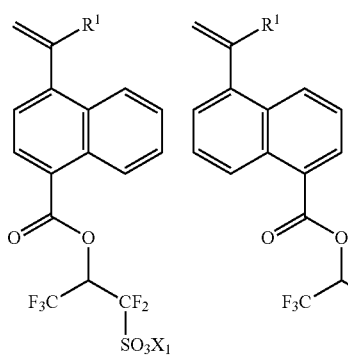
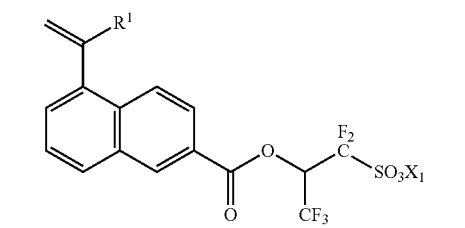
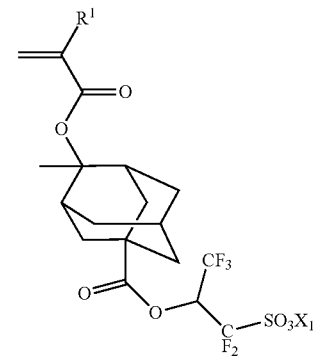

-continued

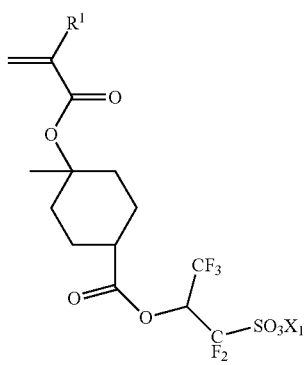

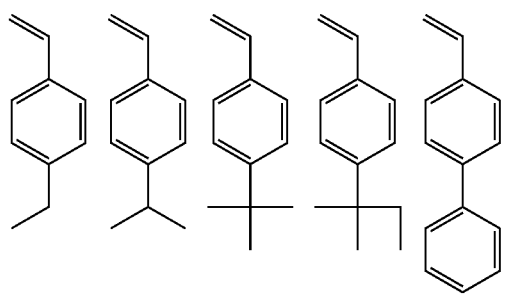

wherein $R^1$ has the same meaning as defined above, and $X_1$ represents a hydrogen atom, a lithium atom, a sodium atom, a potassium atom, an amine compound, or a sulfonium compound.

Monomers imparting the repeating unit "b" may be specifically exemplified by the following.

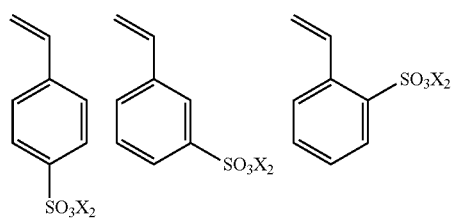

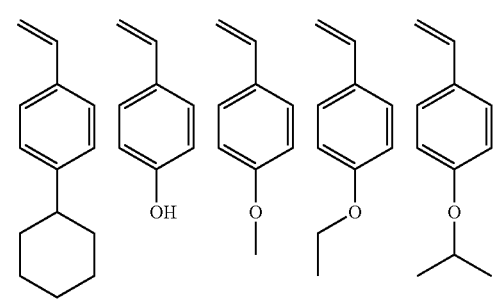

wherein $X_2$ represents a hydrogen atom, a lithium atom, a sodium atom, a potassium atom, an amine compound, or a sulfonium compound.

When $X_1$ and/or $X_2$ is/are an amine compound(s), the amine compound may be exemplified by (P1a-3) described in Paragraph [0048] of Japanese Patent laid-Open Publication Mo. 2013-228447.

The polymer compound of the present invention may comprise a repeating unit "c" other than the repeating unit "a" and the repeating unit "b". The repeating unit "c" may be exemplified by a styrene-based one, a vinyl naphthalene-based one, a vinyl silane-based one, acenaphthylene, indene, vinyl carbazole, etc.

Monomers imparting the repeating unit "c" may be specifically exemplified by the following.

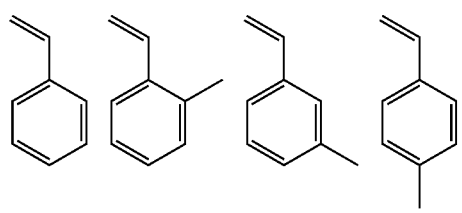

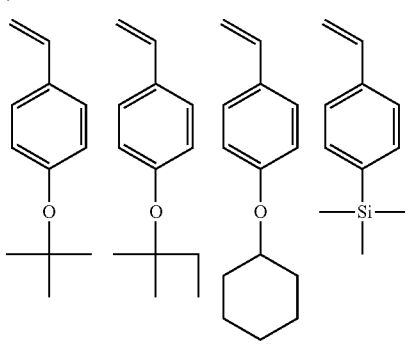

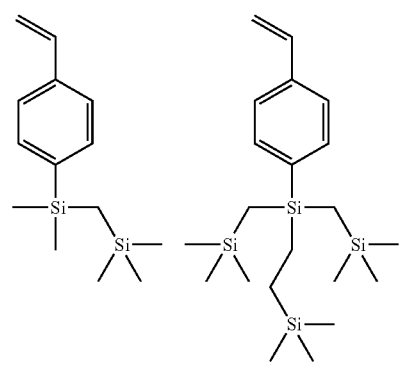

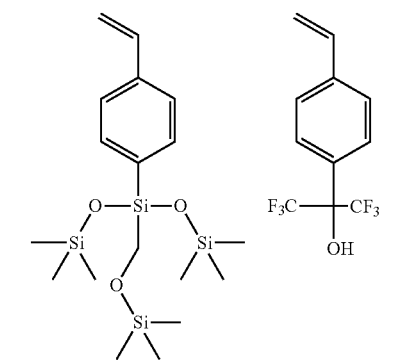

-continued
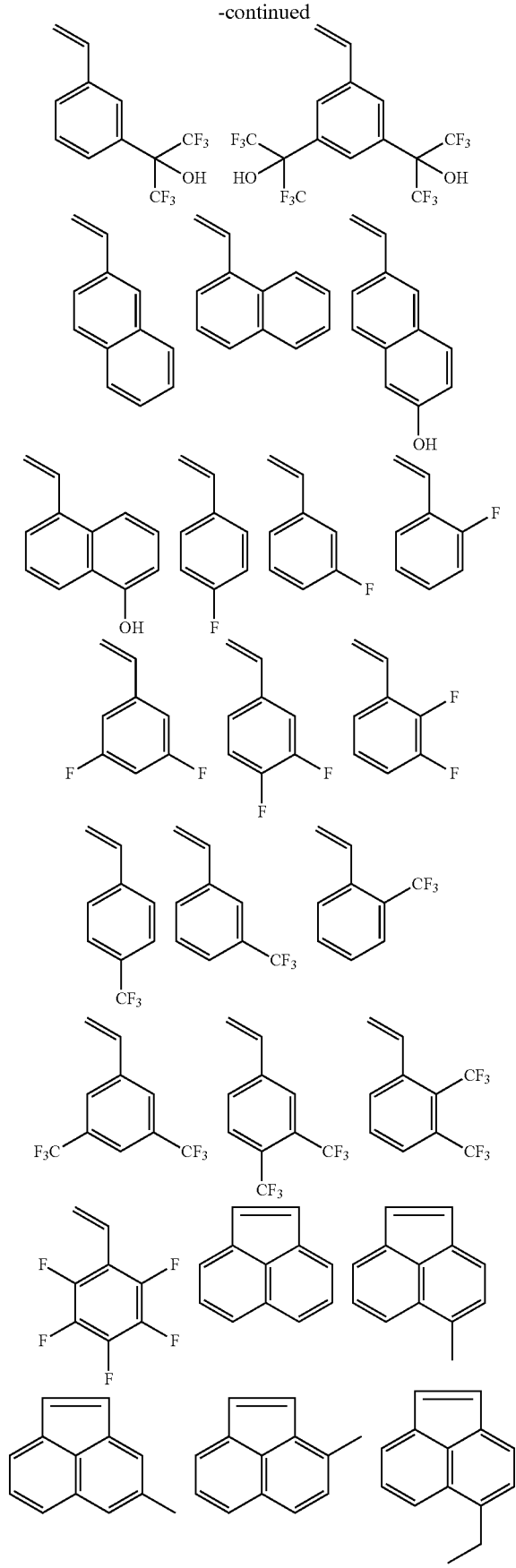
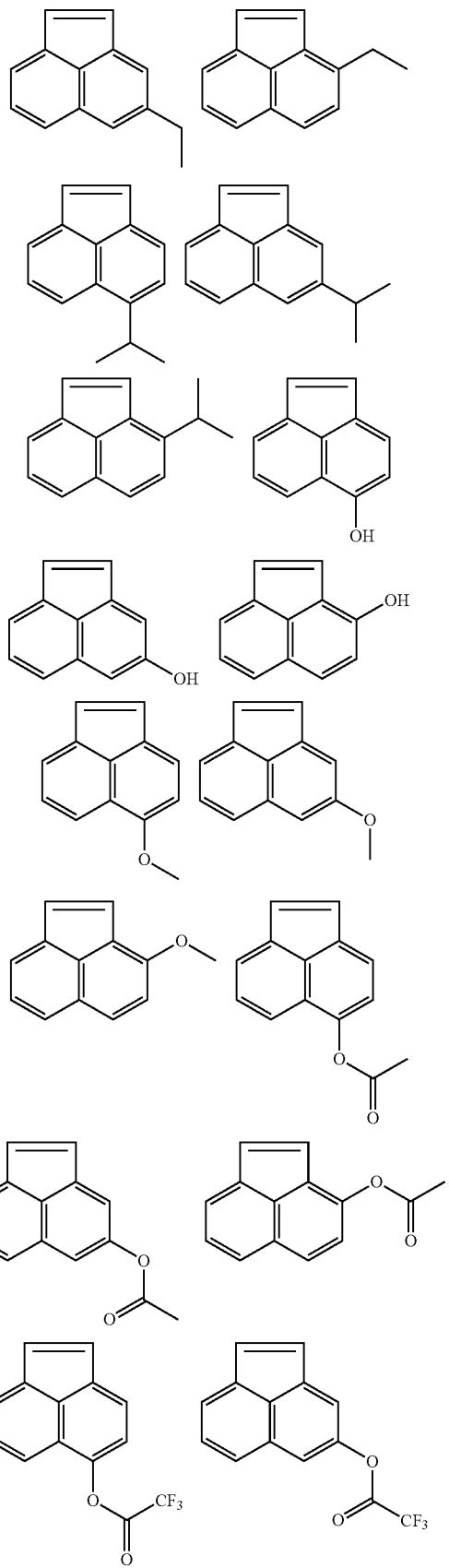

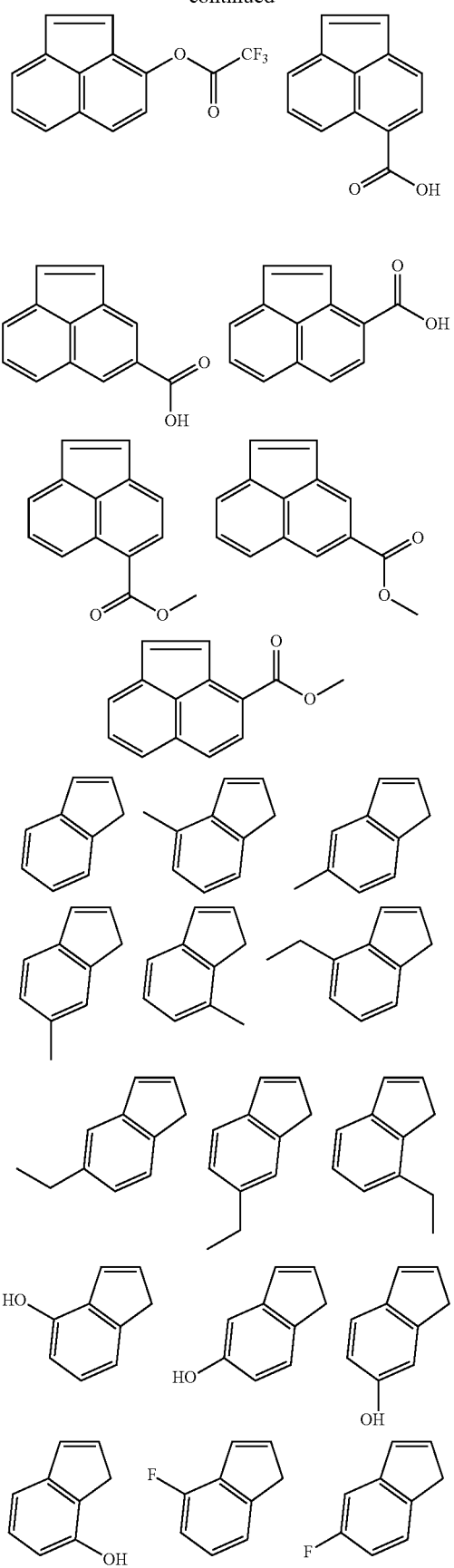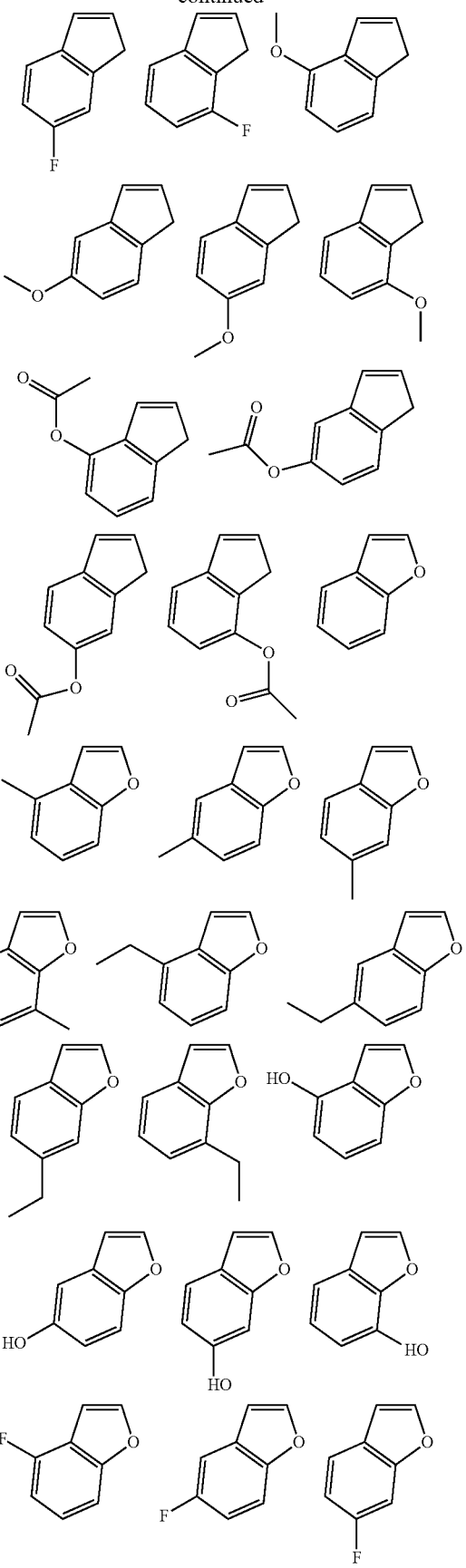

-continued

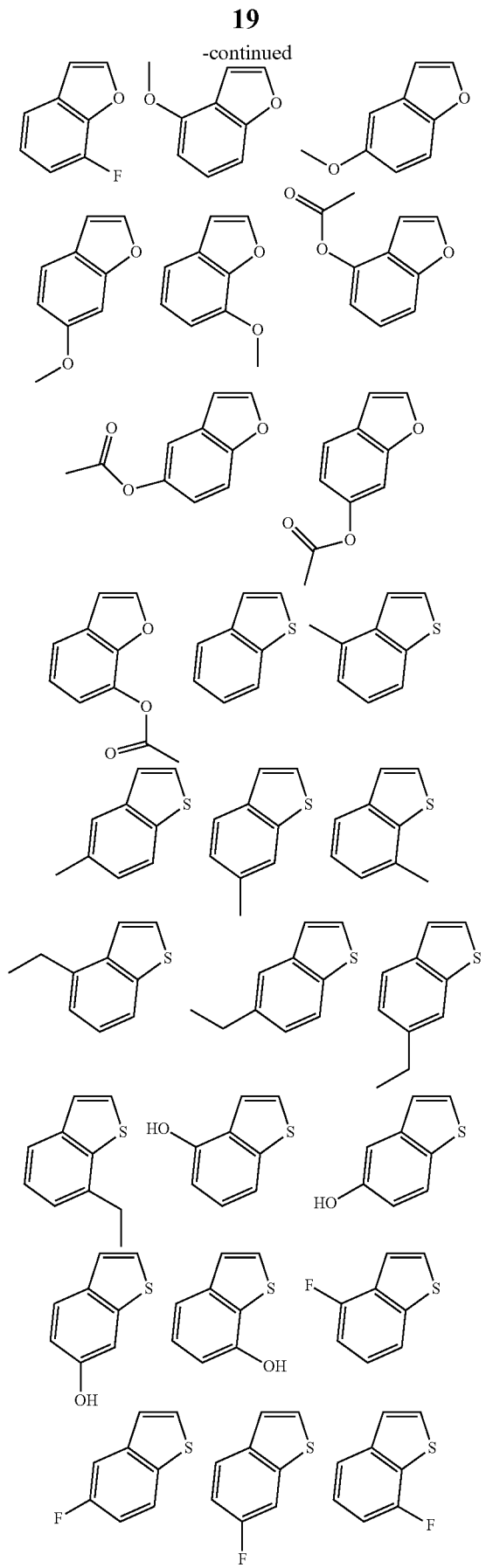

-continued

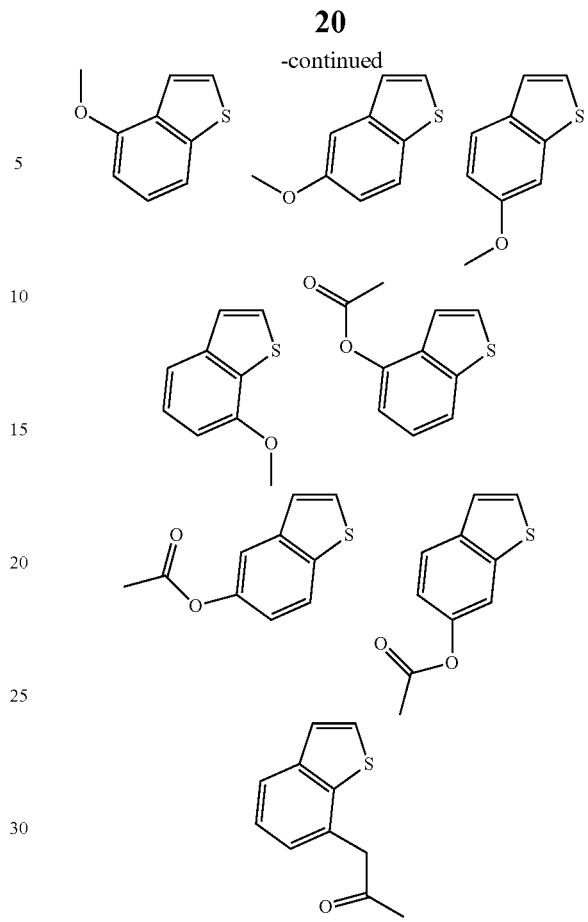

As a method for synthesizing the polymer compound of the present invention, for example, a desired monomer(s) among the above monomers imparting the repeating unit "a" to "c" is/are subjected to heat polymerization by adding a radical polymerization initiator in an organic solvent to obtain a polymer compound of a copolymer.

As the organic solvent to be used for the polymerization, there may be exemplified by toluene, benzene, tetrahydrofuran, diethyl ether, dioxane, cyclohexane, cyclopentane, methyl ethyl ketone, γ-butyrolactone, etc.

As the radical polymerization initiator, there may be exemplified by 2,2'-azobisisobutyronitrile (AIBN), 2,2'-azobis(2,4-dimethyl valeronitrile), dimethyl 2,2-azobis(2-methyl propionate), benzoyl peroxide, lauroyl peroxide, etc.

The reaction temperature is preferably 50 to 80° C., and the reaction time is preferably 2 to 100 hours, more preferably 5 to 20 hours.

In the polymer compound of the present invention, the repeating unit "a" and the repeating unit "b" may be randomly copolymerized, and each thereof may be block copolymerized. When a block copolymerized polymer (block copolymer) is used as a conductive film, it can be expected to obtain a merit that the conductivity is improved by aggregating the repeating unit "a" portion and repeating unit "b" portion with each other to form a sea-island structure.

When a random copolymerization is to be carried out by a radical polymerization, it is general to use the method in which the monomer(s) and a radical polymerization initiator are mixed and polymerized by heating. In the case that the polymerization is started with a monomer imparting repeating unit "a" in the presence of a radical polymerization initiator, and then adding a monomer imparting repeating unit "b" thereto later, the resulting polymer has a structure in which one side of the polymer molecule is a structure that the repeating unit "a" is polymerized, and the other side is a structure that the repeating unit "b" is polymerized. However, in this case, the repeating unit "a" and the repeating unit "b" are mixedly present at the middle portion, which is different in the structure from the block copolymer. For forming the block copolymer by radical polymerization, the living radical polymerization is preferably used.

In a living radical polymerization method called RAFT polymerization (Reversible Addition Fragmentation chain Transfer polymerization), the radical at the polymer terminal is always living, so that it is possible to form a diblock copolymer comprising a block of the repeating unit "a" and a block of the repeating unit "b" by starting the polymerization with a monomer imparting repeating unit "a", and then adding a monomer imparting repeating unit "b" at the time when the monomer imparting repeating unit "a" has been consumed. In addition, it is also possible to form a triblock copolymer such as (a block of repeating unit "a")-(a block of repeating unit "b")-(a block of repeating unit "a") by starting the polymerization with a monomer imparting repeating unit "a", then adding a monomer imparting repeating unit "b" at the time when the monomer imparting repeating unit "a" has been consumed, and then adding the monomer imparting repeating unit "a" thereto.

When the RAFT polymerization is carried out with mixing a monomer imparting repeating unit "a" and a monomer imparting repeating unit "b", the repeating unit "a" and the repeating unit "b" are randomly coordinated; and a narrowly distributed polymer having a narrow molecular weight distribution (degree of distribution) is formed.

The polymer compound of the present invention preferably has a narrow distribution, and the molecular weight distribution (Mw/Mn) thereof is preferably 1.0 to 2.0, particularly preferably 1.0 to 1.5. If the polymer compound has a narrow distribution, it is possible to prevent unevenness of the conductivity in the conductive polymer synthesized by using the polymer compound.

To carry out the RAFT polymerization, a chain transfer agent is necessary, and specific examples thereof may be mentioned 2-cyano-2-propyl benzothioate, 4-cyano-4-(phenylcarbonothioylthio) pentanoic acid, 2-cyano-2-propyldodecyltrithiocarbonate, 4-cyano 4-[(dodecylsulfanylthiocarbonyl) sulfanyl]pentanoic acid, 2-(dodecylthiocarbonothioylthio)-2-methylpropanoic acid, cyanomethyl dodecyl thiocarbonate, cyanomethyl methyl (phenyl) carbamothioate, bis(thiobenzoyl) disulfide, and bis (dodecylsulfanylthiocarbonyl) disulfide. Among these, 2-cyano-2-propyl benzothioate is particularly preferred.

Herein, the ratios of the repeating unit "a" to repeating unit "c" are 0<a<1.0, 0<b<1.0, 0≤c<0, preferably 0.1≤a≤0.9, 0.1≤b≤0.9, 0≤c≤0.8, more preferably 0.2≤a≤0.8, 0.2≤b≤0.8, 0≤c≤0.5.

The condition of a+b+c=1 is preferable.

In addition, if the repeating unit "a" contains one or more selected from the repeating unit "a1" to "a4", they satisfy 0≤a1<1.0, 0≤a2<1.0, 0≤a3<1.0, 0≤a4<1.0, and 0<a1+a2+a3+a4<1.0, preferably 0≤a1≤0.9, 0≤a2≤0.9, 0≤a3≤0.9, 0≤a4≤0.9, and 0.1≤a1+a2+a3+a4≤0.9, more preferably 0≤a1≤0.8, 0≤a2≤0.8, 0≤a3≤0.8, 0≤a4≤0.8, and 0.2≤a1+a2+a3+a4=0.8.

The polymer compound of the present invention has a weight average molecular weight in the range of 1,000 to 500,000, preferably in the range of 2,000 to 200,000. If the weight average molecular weight is less than 1,000, the polymer compound is inferior in heat resistance. On the other hand, if the weight average molecular weight exceeds 500,000, viscosity of the polymer compound is increased, workability is worsened, and solubility in an organic solvent or water is lowered.

The weight average molecular weight (Mw) is a measured value in terms of polystyrene by gel permeation chromatography (GPC) using water, dimethyl formamide (DMF), tetrahydrofuran (THF) as a solvent.

As the monomer in polymerization, a monomer having a sulfo group may be used. Also, lithium salt, sodium salt, potassium salt, ammonium salt, or sulfonium salt of a sulfo group may be used as a monomer to perform polymerization reaction and may be converted into a sulfo group using an ion-exchange resin thereafter.

As mentioned above, the polymer compound of the present invention can be a polymer compound having a specific super strongly acidic sulfo group, which is soluble in an organic solvent, and suitably used for a fuel cell or a dopant for a conductive material such as a conductive polymer.

By using the polymer compound for a fuel cell, a material for a fuel cell having high dielectric constant can be formed. Also, by using it as a dopant for a conjugated double bond polymer, a conductive film having high transparency, high conductivity, and high durability can be formed. Moreover, it is excellent in solubility in an organic solvent, so that deterioration of an organic EL device can be prevented by using it as a conductive film for an organic EL lighting.

EXAMPLES

In the following, the present invention is explained specifically by referring to Examples, but the present invention is not limited by these.

In the following, monomers used in syntheses of Examples are shown.

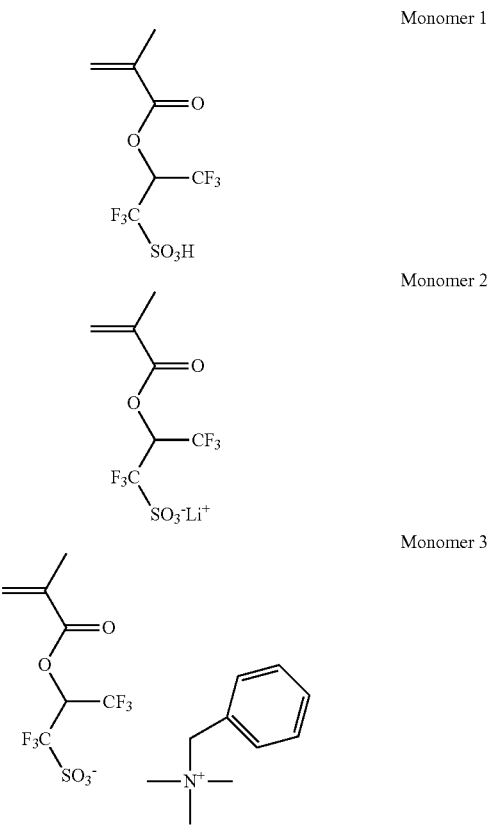

-continued

Monomer 4
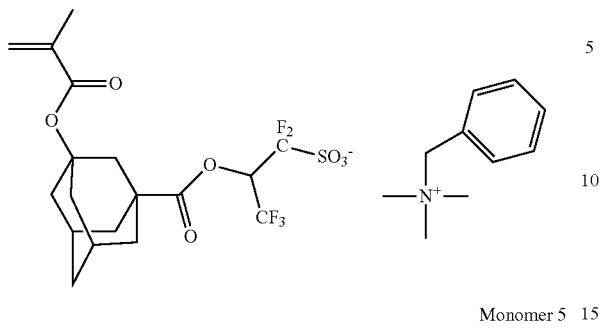

Monomer 5
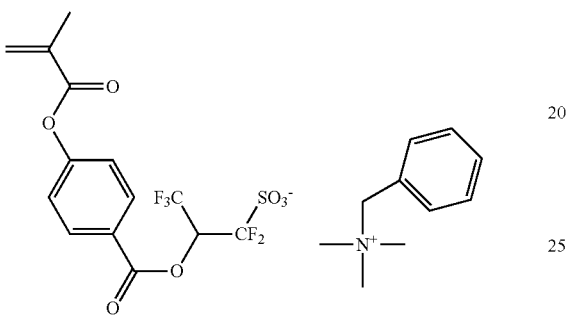

Monomer 6
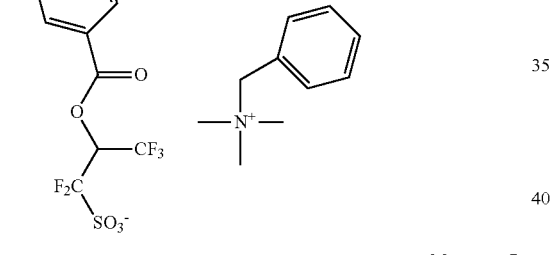

Monomer 7
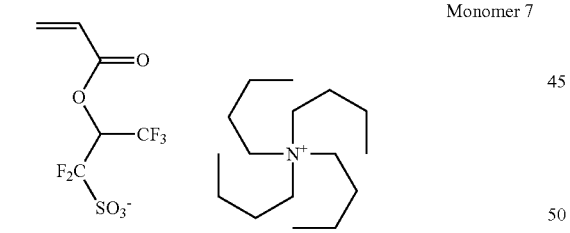

Monomer 8

-continued

Monomer 9
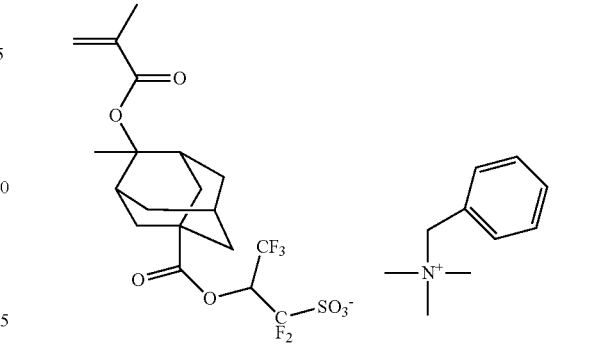

Monomer 10
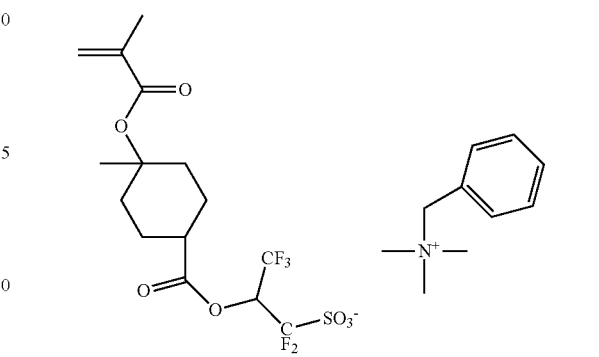

Monomer 1: 1,1,3,3,3-pentafluoro-2-(methacryloyloxy)propane-1-sulfonate

Monomer 2: lithium 1,1,3,3,3-pentafluoro-2-(methacryloyloxy)propane-1-sulfonate

Monomer 3: benzyltrimethylammonium 1,1,3,3,3-pentafluoro-2-(methacryloyloxy) propane-1-sulfonate Monomer 4: benzyltrimethylammonium 1,1,3,3,3-pentafluoro-2-(3-methacryloyloxy-adamantane-1-carbonyloxy)-propane-1-sulfonate Monomer 5: benzyltrimethylammonium 1,1,3,3,3-pentafluoro-2-(3-methacryloyloxybenzene-4-carbonyloxy)-propane-1-sulfonate Monomer 6: benzyltrimethylammonium 2-(4-vinylbenzoyloxy)-1,1,3,3,3-pentafluoropropane-1-sulfonate Monomer 7: tetrabutylammonium 1,1,3,3,3-pentafluoro-2-(acryloyloxy)propane-1-sulfonate Monomer 8: benzyltrimethylammonium 1,1,3,3,3-pentafluoro-2-(4-methacryloyloxy-4-methyladamantane-1-carbonyloxy)-propane-1-sulfonate Monomer 9: benzyltrimethylammonium 1,1,3,3,3-pentafluoro-2-(4-acryloyloxy-4-methyladamantane-1-carbonyloxy)-propane-1-sulfonate Monomer 10: benzyltrimethylammonium 1,1,3,3,3-pentafluoro-2-(4-acryloyloxy-4-methylcyclohexane-1-carbonyloxy)-propane-1-sulfonate Example 1

Under nitrogen atmosphere, to 37.5 g of methanol stirred at 64° C. was added dropwise a solution in which 30.9 g of Monomer 1, 19.1 g of styrene sulfonic acid, and 4.77 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 42.5 g of a white polymer.

When the obtained polymer was measured by $^{19}$F-NMR, $^1$H-NMR, and GPC, the following analytical results could be obtained.

Copolymer composition ratio (molar ratio)
Monomer 1: styrene sulfonic acid=1:1
Weight average molecular weight (Mw)=29,900
Molecular weight distribution (Mw/Mn)=1.91
This polymer compound is made Polymer 1.

Polymer 1

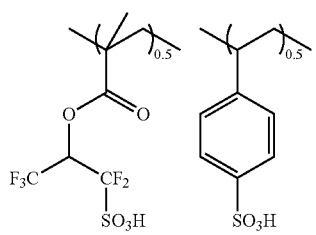

Example 2

Under nitrogen atmosphere, to 37.5 g of methanol stirred at 64° C. was added dropwise a solution in which 20.3 g of Monomer 2, 29.7 g of styrene sulfonic acid lithium, and 5.13 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 48.0 g of a white polymer.

The obtained white polymer was dissolved in 912 g of pure water, and the lithium salt was converted into a sulfo group by using an ion exchange resin. When the obtained polymer was measured by $^{19}$F-NMR, $^1$H-NMR, and GPC, the following analytical results could be obtained.

Copolymer composition ratio (molar ratio)
Monomer 2; styrene sulfonic acid=3:7
Weight average molecular weight (Mw)=23,000
Molecular weight distribution (Mw/Mn)=1.89
This polymer compound is made Polymer 2.

Polymer 2

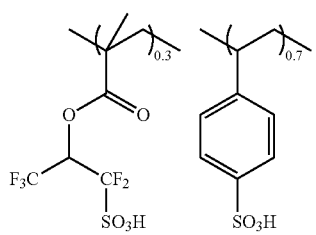

Example 3

Under nitrogen atmosphere, to 37.5 g of methanol stirred at 64° C. was added dropwise a solution in which 39.0 g of Monomer 3, 11.0 g of styrene sulfonic acid lithium, and 3.34 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 46.0 g of a white polymer.

The obtained white polymer was dissolved in 414 g of methanol, and the ammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (molar ratio)
Monomer 3; styrene sulfonic acid=3:2
Weight average molecular weight (Mw)=33,000
Molecular weight distribution (Mw/Mn)=1.31
This polymer compound is made Polymer 3.

Polymer 3

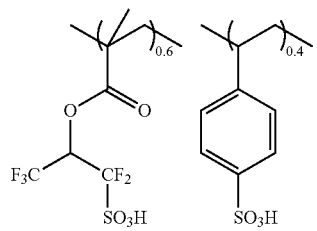

Example 4

Under nitrogen atmosphere, to 37.5 g of methanol stirred at 64° C. was added dropwise a solution in which 38.3 g of Monomer 4, 11.7 g of styrene sulfonic acid lithium, and 2.82 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 46.8 g of a white polymer.

The obtained white polymer was dissolved in 421 g of methanol, and the ammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (molar ratio)
Monomer 4; styrene sulfonic acid=1:1
Weight average molecular weight (Mw)=43,000
Molecular weight distribution (Mw/Mn)=1.77
This polymer compound is made Polymer 4.

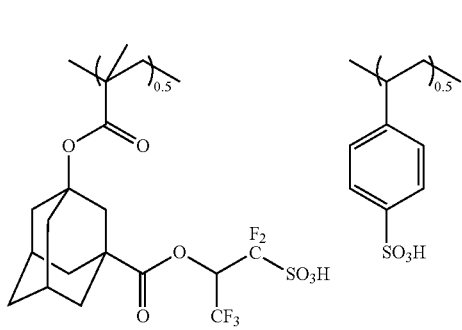

Polymer 4

Example 5

Under nitrogen atmosphere, to 37.5 g of methanol stirred at 64° C. was added dropwise a solution in which 37.5 g of Monomer 5, 12.5 g of styrene sulfonic acid lithium, and 3.04 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 47.1 g of a white polymer.

The obtained white polymer was dissolved in 424 g of methanol, and the ammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (molar ratio)
Monomer 5; styrene sulfonic acid=1:1
Weight average molecular weight (Mw)=39,000
Molecular weight distribution (Mw/Mn)=1.81
This polymer compound is made Polymer 5.

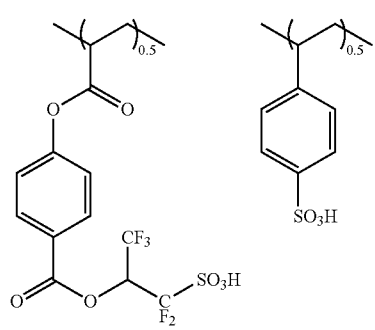

Polymer 5

Example 6

Under nitrogen atmosphere, to 37.5 g of methanol stirred at 64° C. was added dropwise a solution in which 20.4 g of Monomer 3, 17.3 g of styrene sulfonic acid lithium, 12.3 g of 4-(1,1,1,3,3,3-hexafluoro-2-propanol) styrene, and 4.19 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 44.0 g of a white polymer.

The obtained white polymer was dissolved in 396 g of methanol, and the ammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (molar ratio)
Monomer 3: styrene sulfonic acid:4-(1,1,1,3,3,3-hexafluoro-2-propanol) styrene=1:2:1
Weight average molecular weight (Mw)=29,900
Molecular weight distribution (Mw/Mn)=1.91
This polymer compound is made Polymer 6.

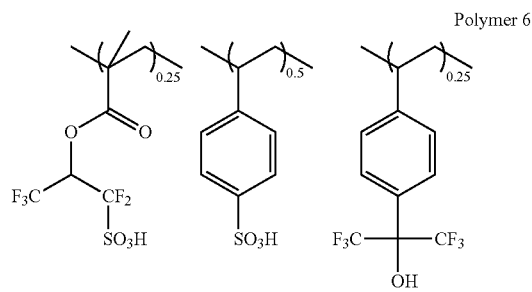

Polymer 6

Example 7

A nallowly distributed polymer was synthesized according to the below mentioned RAFT polymerization.

Under nitrogen atmosphere, in 37.5 g of methanol were dissolved 0.52 g of 2-cyano-2-propyl benzodithioate and 0.13 g of 2,2'-azobisisobutyronitrile, and the solution was stirred at 64° C. for 3 hours under nitrogen atmosphere. To the solution was added dropwise a solution in which 39.0 g of Monomer 3 and 11.0 g of styrene sulfonic acid lithium had been dissolved in 112.5 g of methanol over 4 hours. After completion of the dropwise addition, the mixture was stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 41.0 g of a red polymer.

The obtained red polymer was dissolved in 369 g of methanol, and the ammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (molar ratio)
Monomer 3; styrene sulfonic acid=1:1.
Weight average molecular weight (Mw)=23,000
Molecular weight distribution (Mw/Mn)=1.32
This polymer compound is made Polymer 7.

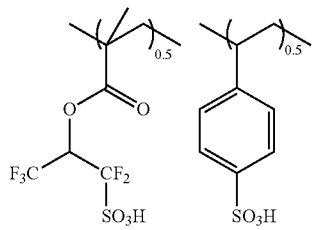

Polymer 7

Example 8

A nallowly distributed polymer was synthesized according to the below mentioned RAFT polymerization.

Under nitrogen atmosphere, in 37.5 g of methanol were dissolved 0.47 g of 2-cyano-2-propyl benzodithioate and 0.12 g of 2,2'-azobisisobutyronitrile, and the solution was stirred at 64° C. for 3 hours under nitrogen atmosphere. To the solution was added dropwise a solution in which 36.3 g of Monomer 6 and 13.7 g of styrene sulfonic acid lithium had been dissolved in 112.5 g of methanol over 4 hours. After completion of the dropwise addition, the mixture was stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 38.0 g of a red polymer.

The obtained red polymer was dissolved in 279 g of methanol, and the ammonium salt and the lithium salt were converted into sulfo groups by using an ion exchange resin. When the obtained polymer was measured by $^{19}$F-NMR, $^{1}$H-NMR, and GPC, the following analytical results could be obtained.
Copolymer composition ratio (molar ratio)
Monomer 6: styrene sulfonic acid=1:1
Weight average molecular weight (Mw)=31,000
Molecular weight distribution (Mw/Mn)=1.38
This polymer compound is made Polymer 8.

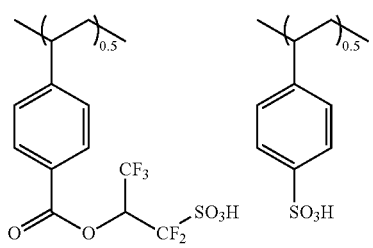

Polymer 8

Example 9

A diblock copolymer was synthesized according to the below mentioned RAFT polymerization.

Under nitrogen atmosphere, in 37.5 g of methanol were dissolved 0.42 g of 2-cyano-2-propyl benzodithioate and 0.10 g of 2,2'-azobisisobutyronitrile, and the solution was stirred at 64° C. for 3 hours under nitrogen atmosphere. To the solution was added dropwise a solution in which 28.6 g of Monomer 3 had been dissolved in 64.3 g of methanol over 2 hours. Subsequently, to the solution was added dropwise a solution in which 21.4 g of styrene sulfonic acid benzyltrimethylammonium had been dissolved in 48.2 g of methanol over 2 hours. After completion of the dropwise addition, the mixture was stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 41.8 g of a red polymer.

The obtained red polymer was dissolved in 306 g of methanol, and the ammonium salt was converted into a sulfo group by using an ion exchange resin. When the obtained polymer was measured by $^{19}$F-NMR, $^{1}$H-NMR, and GPC, the following analytical results could be obtained.
Copolymer composition ratio (molar ratio)
Monomer 3: styrene sulfonic acid=1:1
Weight average molecular weight (Mw)=12,000
Molecular weight distribution (Mw/Mn)=1.31
This polymer compound is made Polymer 9.

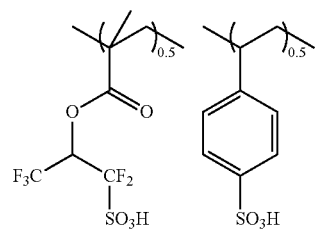

Polymer 9

Example 10

A diblock copolymer was synthesized according to the below mentioned RAFT polymerization.

Under nitrogen atmosphere, in 37.5 g of methanol were dissolved 0.39 g of 2-cyano-2-propyl benzodithioate and 0.10 g of 2,2'-azobisisobutyronitrile, and the solution was stirred at 64° C. for 3 hours under nitrogen atmosphere. To the solution was added dropwise a solution in which 30.2 g of Monomer 6 had been dissolved in 67.9 g of methanol over 2 hours. Subsequently, to the solution was added dropwise a solution in which 19.7 g of styrene sulfonic acid benzyltrimethylammonium had been dissolved in 44.6 g of methanol over 2 hours. After completion of the dropwise addition, the mixture was stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 39.8 g of a red polymer.

The obtained red polymer was dissolved in 279 g of methanol, and the ammonium salt was converted into a sulfo group by using an ion exchange resin. When the obtained polymer was measured by $^{19}$F-NMR, $^{1}$H-NMR, and GPC, the following analytical results could be obtained.

Copolymer composition ratio (molar ratio)
Monomer 6: styrene sulfonic acid=1:1
Weight average molecular weight (Mw)=30,000
Molecular weight distribution (Mw/Mn)=1.36
This polymer compound is made Polymer 10.

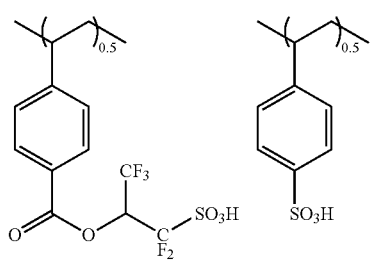

Polymer 10

Example 11

A triblock copolymer was synthesized according to the below mentioned RAFT polymerization.

Under nitrogen atmosphere, in 37.5 g of methanol were dissolved 0.39 g of 2-cyano-2-propyl benzodithioate and 0.10 g of 2,2'-azobisisobutyronitrile, and the solution was stirred at 64° C. for 3 hours under nitrogen atmosphere. To the solution was added dropwise a solution in which 15.1 g of Monomer 6 had been dissolved in 33.9 g of methanol over 2 hours. Subsequently, to the solution was added dropwise a solution in which 19.7 g of styrene sulfonic acid benzyltrimethylammonium had been dissolved in 44.6 g of methanol over 2 hours. Subsequently, to the solution was added dropwise a solution in which 15.1 g of Monomer 6 had been dissolved in 33.9 g of methanol over 2 hours. After completion of the dropwise addition, the mixture was stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 39.8 g of a red polymer.

The obtained red polymer was dissolved in 279 g of methanol, and the ammonium salt was converted into a sulfo group by using an ion exchange resin. When the obtained polymer was measured by $^{19}$F-NMR, $^{1}$H-NMR, and GPC, the following analytical results could be obtained.

Copolymer composition ratio (molar ratio)
Monomer 6: styrene sulfonic acid=1:1
Weight average molecular weight (Mw)=29,000
Molecular weight distribution (Mw/Mn)=1.33
This polymer compound is made Polymer 11.

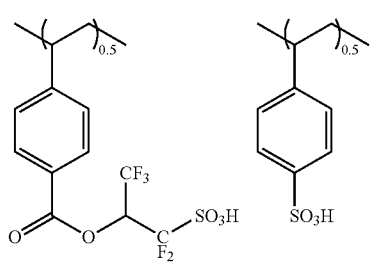

Polymer 11

Example 12

Under nitrogen atmosphere, to 37.5 g of methanol stirred at 64° C. was added dropwise a solution in which 25.3 g of Monomer 7, 19.1 g of styrene sulfonic acid lithium, and 3.34 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 39.6 g of a white polymer.

The obtained white polymer was dissolved in 414 g of methanol, and the ammonium salt and the lithium salt were converted into sulfo groups by using an ion exchange resin. When the obtained polymer was measured by $^{19}$F-NMR, $^{1}$H-NMR, and GPC, the following analytical results could be obtained.

Copolymer composition ratio (molar ratio)
Monomer 7: styrene sulfonic acid=1:1
Weight average molecular weight (Mw)=28,700
Molecular weight distribution (Mw/Mn)=1.58
This polymer compound is made Polymer 12.

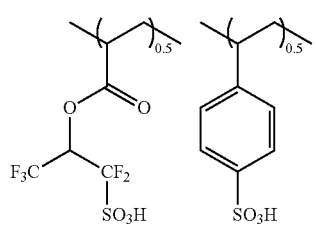

Polymer 12

Example 13

Under nitrogen atmosphere, to 37.5 g of methanol stirred at 64° C. was added dropwise a solution in which 32.0 g of Monomer 8, 19.1 g of styrene sulfonic acid lithium, and 3.34 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 46.9 g of a white polymer.

The obtained white polymer was dissolved in 414 g of methanol, and the ammonium salt and the lithium salt were converted into sulfo groups by using an ion exchange resin. When the obtained polymer was measured by $^{19}$F-NMR, $^{1}$H-NMR, and GPC, the following analytical results could be obtained.

Copolymer composition ratio (molar ratio)
Monomer 8: styrene sulfonic acid=1:1
Weight average molecular weight (Mw)=45,100
Molecular weight distribution (Mw/Mn)=1.93
This polymer compound is made Polymer 13.

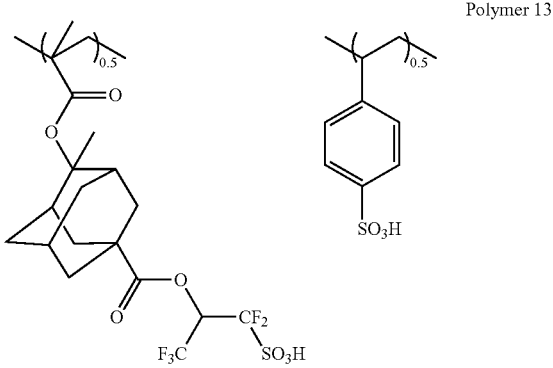

Polymer 13

Example 14

Under nitrogen atmosphere, to 37.5 g of methanol stirred at 64° C. was added dropwise a solution in which 31.3 g of Monomer 9, 19.1 g of styrene sulfonic acid lithium, and 3.34 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 42.7 g of a white polymer.

The obtained white polymer was dissolved in 414 g of methanol, and the ammonium salt and the lithium salt were converted into sulfo groups by using an ion exchange resin. When the obtained polymer was measured by $^{19}$F-NMR, $^1$H-NMR, and GFC, the following analytical results could be obtained.

Copolymer composition ratio (molar ratio)
Monomer 9: styrene sulfonic acid=1:1
Weight average molecular weight (Mw)=38,000
Molecular weight distribution (Mw/Mn)=1.61
This polymer compound is made Polymer 14.

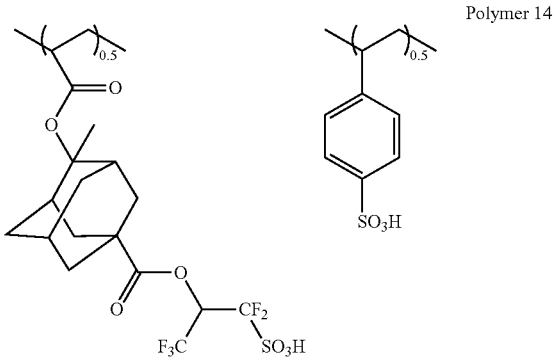

Polymer 14

Example 15

Under nitrogen atmosphere, to 37.5 g of methanol stirred at 64° C. was added dropwise a solution in which 29.4 g of Monomer 10, 19.1 g of styrene sulfonic acid lithium, and 3.34 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 44.1 g of a white polymer.

The obtained white polymer was dissolved in 414 g of methanol, and the ammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (molar ratio)
Monomer 10: styrene sulfonic acid=1:1
Weight average molecular weight (Mw)=48,300
Molecular weight distribution (Mw/Mn)=1.98
This polymer compound is made Polymer 15.

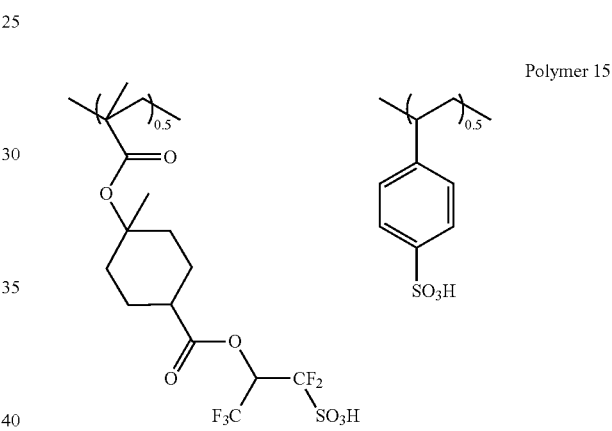

Polymer 15

Polymers 1 to 15 synthesized as mentioned above were soluble in water, methanol, ethanol, isopropyl alcohol, propylene glycol monomethyl ether, tetrahydrofuran, and dimethyl formamide.

Thus, the polymer compound of the present invention can be a polymer compound having a specific super strongly acidic sulfo group, which is soluble in an organic solvent.

It must be stated here that the present invention is not restricted to the embodiments shown by the above-mentioned embodiments. The above-mentioned embodiments are merely examples so that any embodiments composed of substantially the same technical concept as disclosed in the claims of the present invention and expressing a similar effect are included in the technical scope of the present invention.

What is claimed is:

1. A polymer compound which comprises both repeating unit "a" represented by the following general formula (1-1) and repeating unit "b" represented by the following general formula (1-2), and has a weight average molecular weight in the range of 1,000 to 500,000,

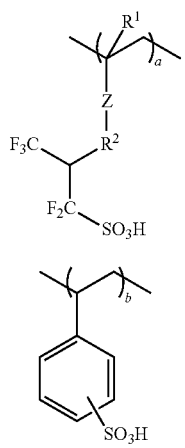

(1-1)

(1-2)

wherein $R^1$ represents a hydrogen atom or a methyl group, $R^2$ represents a single bond, an ester group, or a linear, branched, or cyclic hydrocarbon group having 1 to 12 carbon atoms which may have either or both of an ether group and an ester group, Z represents a phenylene group, a naphthylene group, or an ester group, and "a" and "b" satisfy $0<a<1.0$ and $0<b<1.0$, and wherein "a" represents the relative fractional amount of the repeating units of general formula (1-1) in the polymer compound, and "b" represents the relative fractional amount of the repeating units of general formula (1-2) in the polymer compound.

2. The polymer compound according to claim 1, wherein the repeating unit "a" contains one or more selected from repeating unit "a1" to "a4" represented by the following general formulae (2-1) to (2-4),

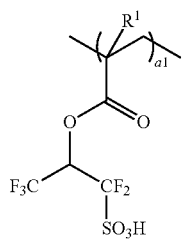

(2-1)

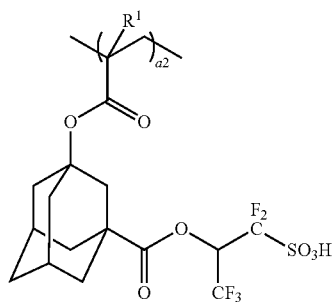

(2-2)

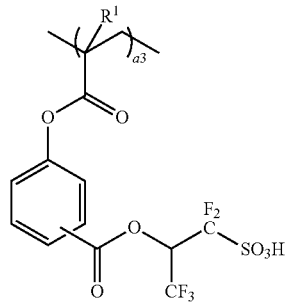

(2-3)

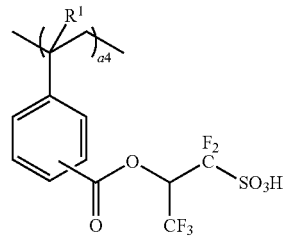

(2-4)

wherein $R^1$ has the same meaning as defined above, and "a1", "a2", "a3", and "a4" satisfy $0 \le a1 < 1.0$, $0 \le a2 < 1.0$, $0 \le a3 < 1.0$, $0 \le a4 < 1.0$, and $0 < a1+a2+a3+a4 < 1.0$, and wherein "a1" represents the relative fractional amount of the repeating units of general formula (2-1) in the polymer compound, "a2" represents the relative fractional amount of the repeating units of general formula (2-2) in the polymer compound, "a3" represents the relative fractional amount of the repeating units of general formula (2-3) in the polymer compound, and "a4" represents the relative fractional amount of the repeating units of general formula (2-4) in the polymer compound.

3. The polymer compound according to claim 1, wherein the polymer compound is a block copolymer.

4. The polymer compound according to claim 2, wherein the polymer compound is a block copolymer.

5. The polymer compound according to claim 1, wherein the polymer compound is used as a dopant for a conductive polymer.

6. The polymer compound according to claim 2, wherein the polymer compound is used as a dopant for a conductive polymer.

7. The polymer compound according to claim 3, wherein the polymer compound is used as a dopant for a conductive polymer.

8. The polymer compound according to claim 4, wherein the polymer compound is used as a dopant for a conductive polymer.

* * * * *